(12) United States Patent
Suryanarayana

(10) Patent No.: US 8,224,999 B2
(45) Date of Patent: Jul. 17, 2012

(54) WORLD WIDE WEB CONTENT SYNCHRONIZATION BETWEEN WIRELESS DEVICES

(75) Inventor: Lalitha Suryanarayana, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1039 days.

(21) Appl. No.: 11/234,991

(22) Filed: Sep. 26, 2005

(65) Prior Publication Data

US 2006/0020716 A1 Jan. 26, 2006

Related U.S. Application Data

(63) Continuation of application No. 09/839,256, filed on Apr. 20, 2001, now Pat. No. 6,981,062.

(51) Int. Cl.
G06F 15/16 (2006.01)

(52) U.S. Cl. ........ 709/248; 709/227; 709/201; 709/204; 709/208; 709/217; 709/220

(58) Field of Classification Search .................. 709/248, 709/227, 201, 204, 208, 217, 220
See application file for complete search history.

(56) References Cited

U.S. PATENT DOCUMENTS

| | | | |
|---|---|---|---|
| 5,926,816 A | 7/1999 | Bauer et al. | |
| 5,944,791 A | 8/1999 | Scherpbier | |
| 5,951,652 A * | 9/1999 | Ingrassia et al. | ............. 709/248 |
| 5,954,798 A | 9/1999 | Shelton et al. | |
| 6,018,762 A | 1/2000 | Brunson et al. | |
| 6,108,687 A | 8/2000 | Craig | |
| 6,144,991 A | 11/2000 | England | |
| 6,212,192 B1 | 4/2001 | Mirashrafi et al. | |
| 6,289,333 B1 | 9/2001 | Jawahar et al. | |
| 6,295,551 B1 | 9/2001 | Roberts et al. | |
| 6,311,215 B1 | 10/2001 | Bakshi et al. | |
| 6,336,137 B1 | 1/2002 | Lee et al. | |
| 6,360,250 B1 | 3/2002 | Anupam et al. | |
| 6,366,771 B1 | 4/2002 | Angle et al. | |
| 6,421,733 B1 | 7/2002 | Tso et al. | |
| 6,430,624 B1 | 8/2002 | Jamtgaard et al. | |
| 6,449,622 B1 | 9/2002 | LaRue et al. | |
| 6,466,783 B2 | 10/2002 | Dahm et al. | |
| 6,477,543 B1 * | 11/2002 | Huang et al. | .................. 707/200 |
| 6,615,246 B2 | 9/2003 | Pivowar et al. | |
| 6,654,785 B1 * | 11/2003 | Craig | ............................ 709/203 |

(Continued)

FOREIGN PATENT DOCUMENTS

EP 1 018 689 A2 7/2000

OTHER PUBLICATIONS

"*Wireless Application Protocol Push Architectural Overview*", WAP Push Architectural Overview, Version Nov. 8, 1999.

(Continued)

*Primary Examiner* — Lan-Dai T Truong
(74) *Attorney, Agent, or Firm* — Turocy & Watson, LLP

(57) ABSTRACT

Wireless access protocol-capable wireless devices are able to synchronize displayed Web content. A first WAP device requests a synchronized session through the sync Proxy of the network. The sync Proxy, through a WAP Push Proxy, sets up the synchronized session. One or both wireless devices may then request content from a Web site. This content is transmitted from the Web site to the first device, and through a WAP proxy to the second device.

19 Claims, 9 Drawing Sheets

U.S. PATENT DOCUMENTS

| | | | |
|---|---|---|---|
| 6,668,273 | B1 | 12/2003 | Rust |
| 6,668,276 | B1 | 12/2003 | Ohkado et al. |
| 6,675,219 | B1 | 1/2004 | Leppinen et al. |
| 6,693,661 | B1 | 2/2004 | Vanderwilt et al. |
| 6,708,206 | B1 | 3/2004 | Thrane et al. |
| 6,741,853 | B1 | 5/2004 | Jiang et al. |
| 6,760,749 | B1 | 7/2004 | Dunlap et al. |
| 6,792,265 | B1 | 9/2004 | Chan et al. |
| 6,799,033 | B2 | 9/2004 | Kanefsky |
| 6,799,203 | B2 | 9/2004 | Oommen |
| 6,865,171 | B1 | 3/2005 | Nilsson |
| 6,895,433 | B1 * | 5/2005 | Slater et al. ............. 709/220 |
| 6,958,981 | B1 * | 10/2005 | Hemminger ............. 370/270 |
| 6,976,094 | B1 * | 12/2005 | Dalrymple et al. ....... 709/248 |
| 7,277,408 | B2 * | 10/2007 | Sorsa ........................ 370/328 |
| 2002/0078154 | A1 * | 6/2002 | Djennane et al. ......... 709/205 |
| 2002/0107830 | A1 * | 8/2002 | Nanja ......................... 707/1 |
| 2002/0112063 | A1 * | 8/2002 | Lohr et al. ................. 709/230 |
| 2002/0143859 | A1 * | 10/2002 | Kuki et al. ................. 709/203 |
| 2005/0149487 | A1 * | 7/2005 | Celik ........................ 707/1 |
| 2006/0129487 | A1 * | 6/2006 | Shafiee et al. ............ 705/50 |

OTHER PUBLICATIONS

WAP Forum "Push OTA Protocol," Apr. 25, 2001; 44 pages, retrieved from http://www.wapforum.org/what/technical.htm.

Wireless Application Protocol Push OTA Protocol Specification; WAP Push OTA Protocol WAP—189-PushOTA, Version Feb. 17, 2000, pp. 1-20.

WAP FORUM, WAP Push Message, Aug. 22, 1999, WAP Forum, pp. 1-23.

Protocols.com, WAP Wireless Communication, 1999, Protocols.com, pp. 1-5.

European Search Report for European Patent Application 01998072.1 dated Feb. 5, 2008; 3 pages.

International Search Report for PCT Application No. PCT/US01/49607 dated Jul. 9, 2002; 2 pages.

OA dated Sep. 15, 2004 for U.S. Appl. 09/839,256; 12 pages.

* cited by examiner

WORLD WIDE WEB CONTENT SYNCHRONIZATION BETWEEN WIRELESS DEVICES

RELATED APPLICATIONS

The present patent document is a continuation of U.S. patent application Ser. No. 09/839,256, filed Apr. 20, 2001, now U.S. Pat. No. 6,981,062 the entirety of which is hereby incorporated by reference.

BACKGROUND

I. Field of the Invention

The present invention relates generally to wireless communications. Particularly, the present invention relates to Wireless Access Protocol (WAP)-enabled devices.

II. Description of the Related Art

The capability of wireless devices is rapidly increasing. Wireless devices now have the ability to access the Internet using a microbrowser that is part of the telephone. The microbrowser is a very simple version of personal computer browsers such as MICROSOFT'S INTERNET EXPLORER and NETSCAPE'S COMMUNICATOR. This Internet browsing capability is being standardized through a wireless access protocol (WAP) forum that is setting the rules for communicating in a wireless manner with the Internet.

A language designed for this type of communication is the wireless markup language (WML). This language is an application of Extensible Markup Language (XML). WML was designed for wireless communication devices with small, low-resolution screens that are prevalent on cellular telephones.

Accessing information from the Internet using a wireless telephone enables one to determine entertainment information in the telephone's area as well as the telephone numbers, email addresses, and directions to those establishments. Using this information, the telephone user can send a message to these establishments or carry out electronic commerce transactions online.

Two people communicating with WAP-enabled telephones can access the same World Wide Web content (hereinafter "Web content") simultaneously but cannot be sure that they are viewing the exact same information without one party reading off the entire Universal Resource Locator (URL) to the other party. This puts a similar burden on the other party to correctly enter that URL without making any typographical errors. Since some URL's are quite lengthy and complex and, sometimes, not even human understandable this creates a burden on each party to make sure they are looking at the same piece of information. There is a need for multiple parties to be able to easily access the same content without the burden of URL communication and entry.

DETAILED DESCRIPTION OF THE DRAWINGS

The Web content synchronization system and process of the present invention enable two or more device users to view the Web content simultaneously. At least one of these must be a mobile, wireless device. This is accomplished by one party pushing the Web page to the other party such that the receiving wireless device essentially synchronizes with the pushing device in terms of the content rendered on the two devices.

Wireless Access Protocol (WAP)-enabled wireless devices are becoming more popular due to the information delivered to the wireless device and options available to the user. The WAP-enabled wireless device is comprised of Web browser-type software that enables the wireless device user to access information over the Internet in addition to controlling the operation of the device.

The WAP protocol and architecture discussed herein is well known in the art. A further discussion of WAP is available from the WAP forum. Most documents generated by the WAP forum are available over the Internet at www.wapforum.org.

Figure 1:
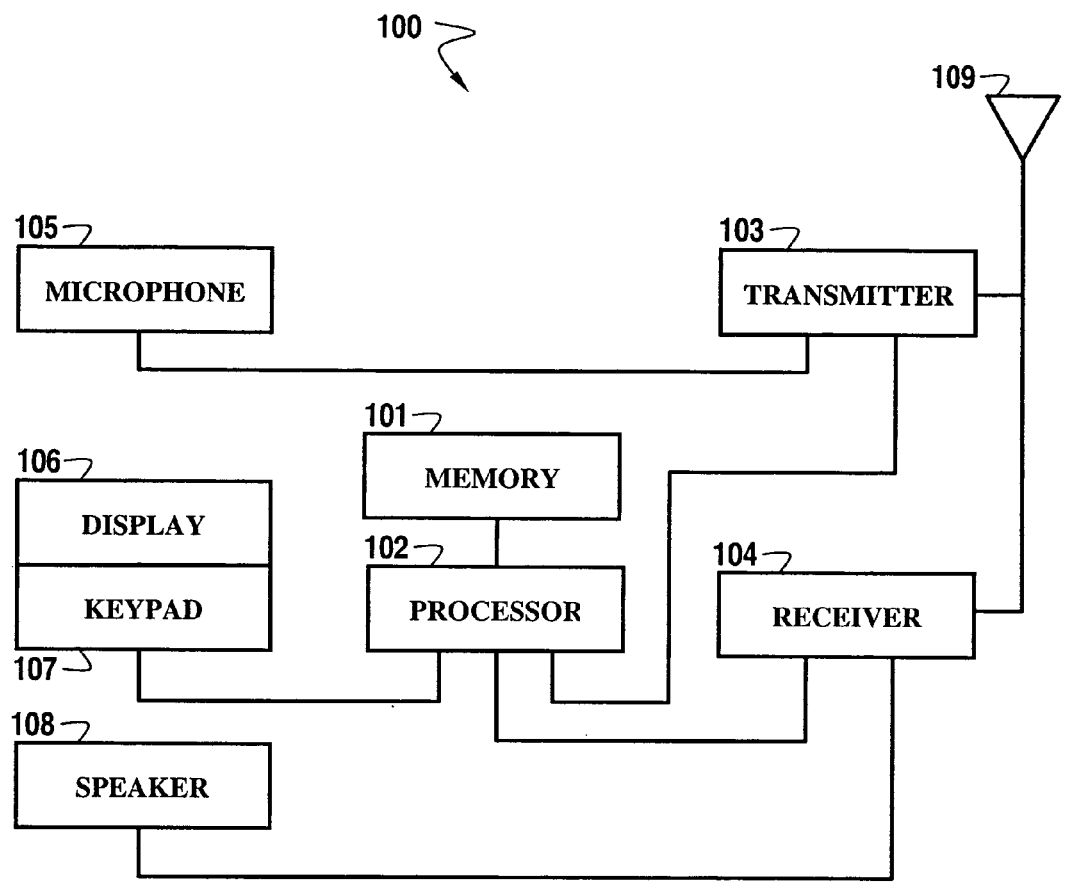
FIG. 1 shows a block diagram of a Wireless Access Protocol (WAP)-enabled wireless telephone in accordance with the present invention.

FIG. 1 illustrates a block diagram of a typical WAP-enabled wireless device (100). The device (100) is comprised of a microphone (105) for converting a voice signal to an electrical signal for transmission by the transmitter (103) and radiated over the antenna (109). Signals received by the antenna (109) are received and demodulated by the receiver (104) before being converted to an aural signal by the speaker (108). The device user inputs information and operates the device by the keypad (107). The display (106) shows the user what was input on the keypad (107) as well as information that was received by the receiver (104).

A processor (102) that is coupled to memory (101) controls the wireless device (100). The processor scans the keypad (107) for inputs, displays appropriate data on the display (106), and controls the transmission and reception of data.

The processor (102) is also responsible for running any processes used by the device. For example, since the device is WAP-enabled, the processor (102) runs the Web browser-type process, referred to as the user agent, that communicates data over the Internet. The user agent is responsible for interacting with the World Wide Web and Internet such as sending and retrieving e-mails, accessing and rendering Web content, and sending information to a Web site.

The user agent is a smaller version of the Web browser programs written for personal computers. These include programs such as MICROSOFT INTERNET EXPLORER and NETSCAPE NAVIGATOR. The user agent for the WAP-capable device is required to be smaller in size in order to fit in the memory of the device. The user agent must also download and render Web content equivalents (such as decks and cards) for a substantially smaller screen on the device than that used in a typical personal computer. The user agent is well known in the art and is not discussed further herein.

While the preferred embodiment of the present invention is described as using the WAP-enabled wireless device (100) of FIG. 1, other types of WAP capable wireless communication devices also operate effectively with the process of the present invention. Alternate embodiments include a WAP-capable personal digital assistant (PDA) and a WAP-capable cellular telephone.

Figure 2:
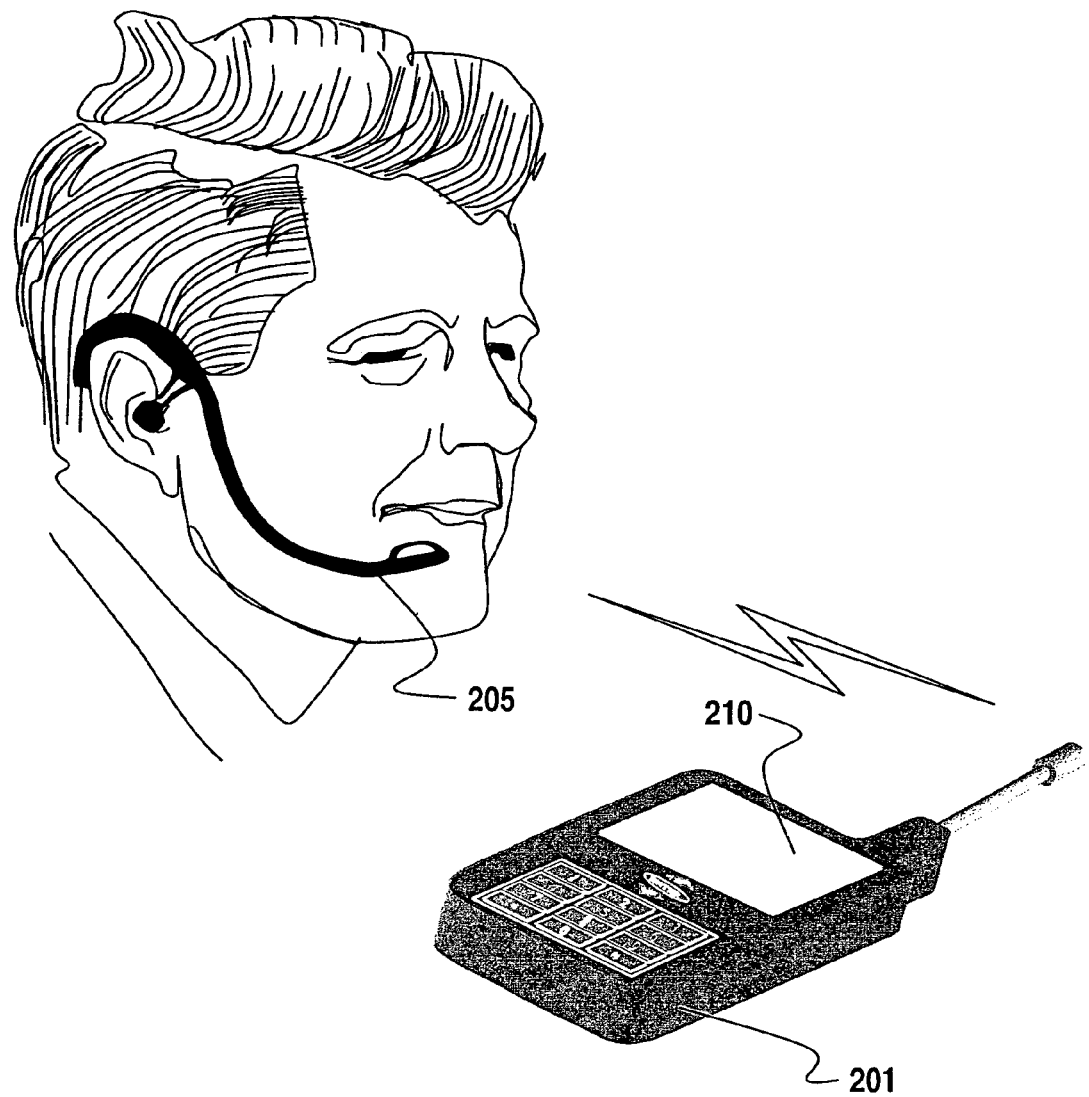
FIG. 2 shows a diagram of a WAP-enabled wireless communication device using a cordless headset in accordance with the present invention.

FIG. 2 illustrates an alternate embodiment wireless communication device of the present invention. This embodiment uses a wireless headset (205) to communicate with the wireless telephone or other communication device (201) of the present invention. Another embodiment uses a wired headset.

In a typical wireless communication device, the user must hold the device against their ear and mouth in order to communicate effectively. With the Web content synchronization process of the present invention, however, the user is likely going to be watching Web content on the device's screen (210) while communicating with the other party on the phone. A headset (205) allows the parties to communicate and watch the screens of their respective communication devices without constantly moving the communication devices from their faces to a comfortable viewing position.

An example of such a wireless headset embodiment is the Bluetooth standard being developed by major cellular telephone manufacturers. This standard uses a low power (approximately 1 mW) transmitter in the headset (205) and communication device (201) that enables them to communicate back and forth without wires. The information communicated between the headset (205) and the device (201) operates at 2.4 GHz, a data rate of up to 720 kb/s, and can reach distances of 10 meters.

Figure 3:
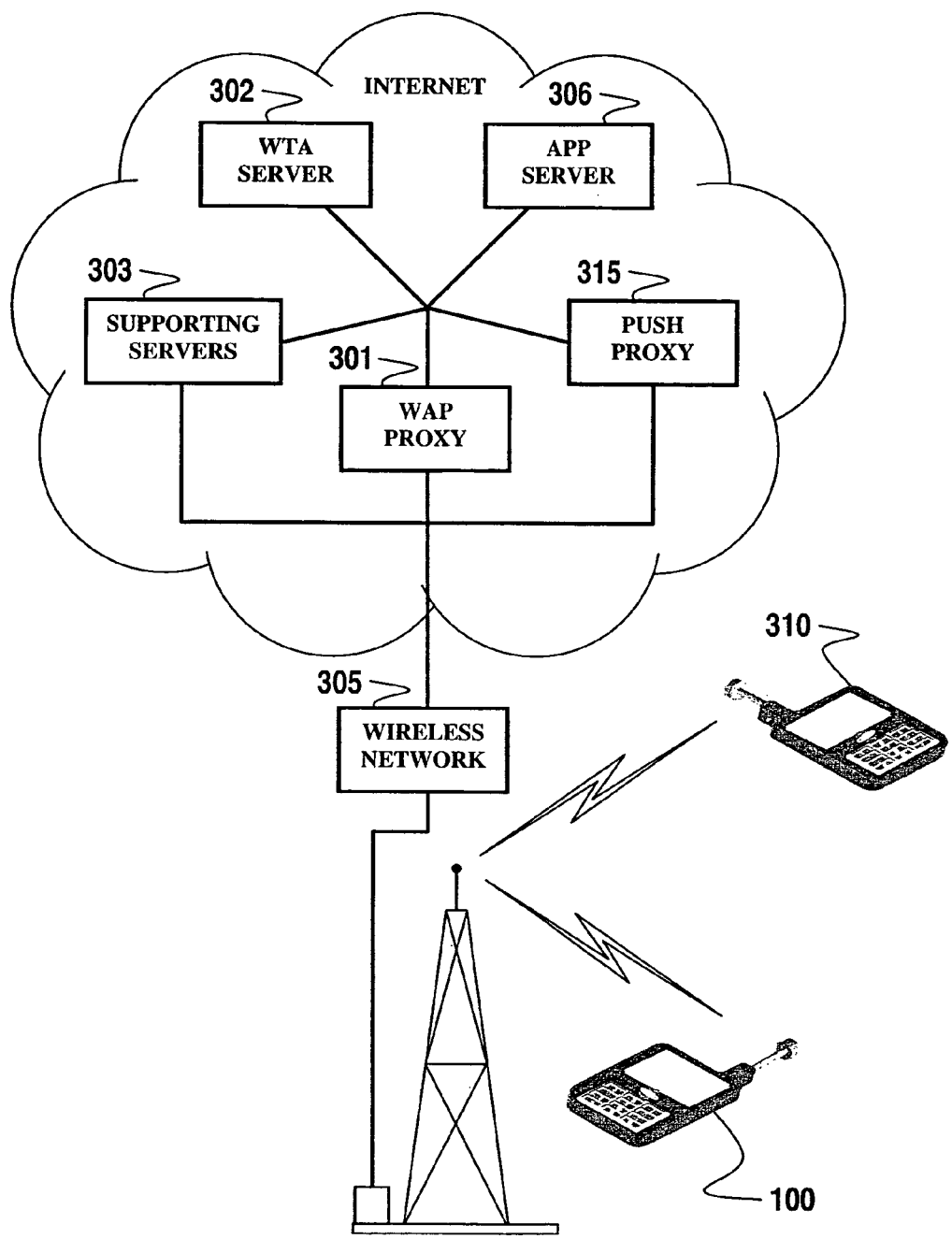
FIG. 3 shows a block diagram of a Wireless Access Protocol system used by a WAP-enabled wireless telephone.

FIG. 3 illustrates a block diagram of a WAP network of the present invention. This network is comprised of the WAP-enabled cellular, wireless device (100) that is illustrated in FIG. 1. The wireless device (100) communicates with the wireless network (305). In the preferred embodiment, the wireless network is a cellular network.

For purposes of clarity, the wireless device (100) of the present invention is illustrated communicating with one other WAP-enabled wireless device (310). However, the present invention is not limited to communication with only one wireless device. Conference calling features allow the conferencing of multiple wireless devices.

As is well known in the art, the cellular network (305) is comprised of a large number of fixed antennas coupled to low power transmitters. Each antenna radiates into a segmented 360.degree. area. The number of segments depends on the number of directional antennas employed. Examples of such networks are the AMPS cellular network, the GSM cellular network, and the CDMA PCS networks. The cellular network of the present invention is well known in the art and its operation is not discussed further.

The present invention assumes that the wireless devices are capable of simultaneous voice and data sessions and the networks can support such technologies. One example is a GPRS class A device. Another embodiment includes an all IP network that can also support voice over IP.

Alternate embodiments of the present invention use other forms of wireless communication networks besides cellular or PCS. For example, a series of omni-directional antennas located in a geographical area and communicating with wireless devices would perform substantially the same communication function as the cellular system of the preferred embodiment.

Referring again to FIG. 3, the wireless network (305) allows the wireless device (100) to communicate with a WAP Proxy (301). As is well known in the art, a proxy is an intermediary program that acts as both a server and a client for the purpose of making requests on behalf of other clients, such as the wireless device (100) in the present embodiment. The proxy typically resides between clients and servers that may have no means of direct communication (e.g., across a firewall). Requests are either serviced by the proxy program or passed on, with possible translation, to other servers. The WAP gateway function of the WAP proxy enables protocol conversion such as from WAP WSP to HTTP and vice versa.

Proxies can also add value by enabling features and providing enhancements such as caching, transcoding, and privacy enhancement. The present invention uses a "sync" proxy that can do the following: a) have information about subscribers subscribed to the sync service; b) sit in between the server and the user agent and carry out proxy functions; c) capture the sync initiate message, and know when a sync session is on, and between which parties; d) act as a WAP push initiator; e) capture the URLs in the get request; and f) act as a caching proxy for returned content if necessary. Some of embodiments show a WAP proxy also acting as a sync proxy and a transcoding proxy also acting as a sync proxy.

In the present embodiment, the WAP Proxy (301) translates the WSP or W-HTTP requests from the wireless device (100) to the protocol used by the World Wide Web. This allows the wireless device (100) to submit requests for information to the supporting Web servers (303). The WAP Proxy (301) may also encode as necessary, the responses from the Web servers (303) into the compact binary format understood by the wireless device (100).

Also in the present embodiment, the WAP Proxy (301) serves as a push initiator. The push operation in WAP occurs when the Push Initiator transmits content to a client using the combination of Push Access Protocol and Push Over-the-Air protocol. The Push Initiator shares no protocol directly with the WAP client; the Push Initiator is on the Internet and the WAP client is in the WAP domain. WAP Push Over-the-Air Protocol is well known in the art and is disclosed in greater detail in the WAP forum's specification WAP Push OTA Protocol WAP-189-PushOTA Version 17 February 2000.

A WAP Push Proxy gateway (PPG) (315) communicates with the second wireless device (310) of the present invention by pushing signals to the device (310). The WAP proxy (301) that acts as a push initiator communicates signals with the Push Proxy Gateway (315).

WAP capable devices access web servers that communicate using HTTP in order to render WML and WMLscript content to the devices. WML is an application of XML. WML is required due to the reduced capabilities of the WAP capable wireless devices as well as the constraints imposed by the low bandwidth wireless networks as compared to a personal computer with substantially more memory and processing power and accessing the Internet over higher speed connections.

Alternate embodiments are not constrained to WML. For example, future embodiments of WAP may be XHTML-based and not use WML.

If the Web servers (303), or application servers (306) provide WAP content, the WAP Proxy (301) retrieves it directly from the Web server (303 or 306). However, if the Web servers (303 or 306) provide Web content (such as HTML), the proxy (301) may translate the Web content into the WAP content. For example, the WAP proxy (301) could translate HTML into WML. The wireless device (100) then accesses the Web content from the WAP Proxy (301).

The Web server (303) stores (caches) the information and Web content that are accessed by both WAP devices and typical personal computers over the Internet. For purposes of clarity, only one Web server (303) and one application server (306) are shown in FIG. 3. In reality, depending on the information required by the wireless device (100), multiple Web servers may be needed. Each Web server may reside at a different site and be operated by a different company. While the preferred embodiment illustrates the WAP Proxy (301) and Web server (303) as being separate entities, alternate embodiments include a WAP gateway function as part of the Web origin server serving the content.

A Wireless Telephony Application (WTA) (302) server is a special kind of origin server that communicates with the WAP wireless device (100) directly. The WTA server (302), therefore, operates in the WML format. The WTA server (302) provides WAP access to features of the wireless network provider's telecommunications infrastructure. For example, the network provider may provide storage of telephone numbers and addresses for the telephone user. The user can then access these numbers through the WTA server (302) using the wireless device's user agent.

In subsequent discussions of the processes of the present invention, User1 and User2 refer to the client processes in the WAP-enabled communication devices of the present invention. For example, the WAP user agent would be responsible for processing received signals and transmitting acknowledgements to the signals.

Subsequent discussions additionally refer to various commands and messages, such as the HTTP or WSP/W-HTTP "Get" command, specified by WAP. These commands, their formats, and the responses are well known in the art and are not discussed further. For a more in-depth discussion of these signals, please refer to the W3C, IETF and WAP Forum Web site.

Figure 4:
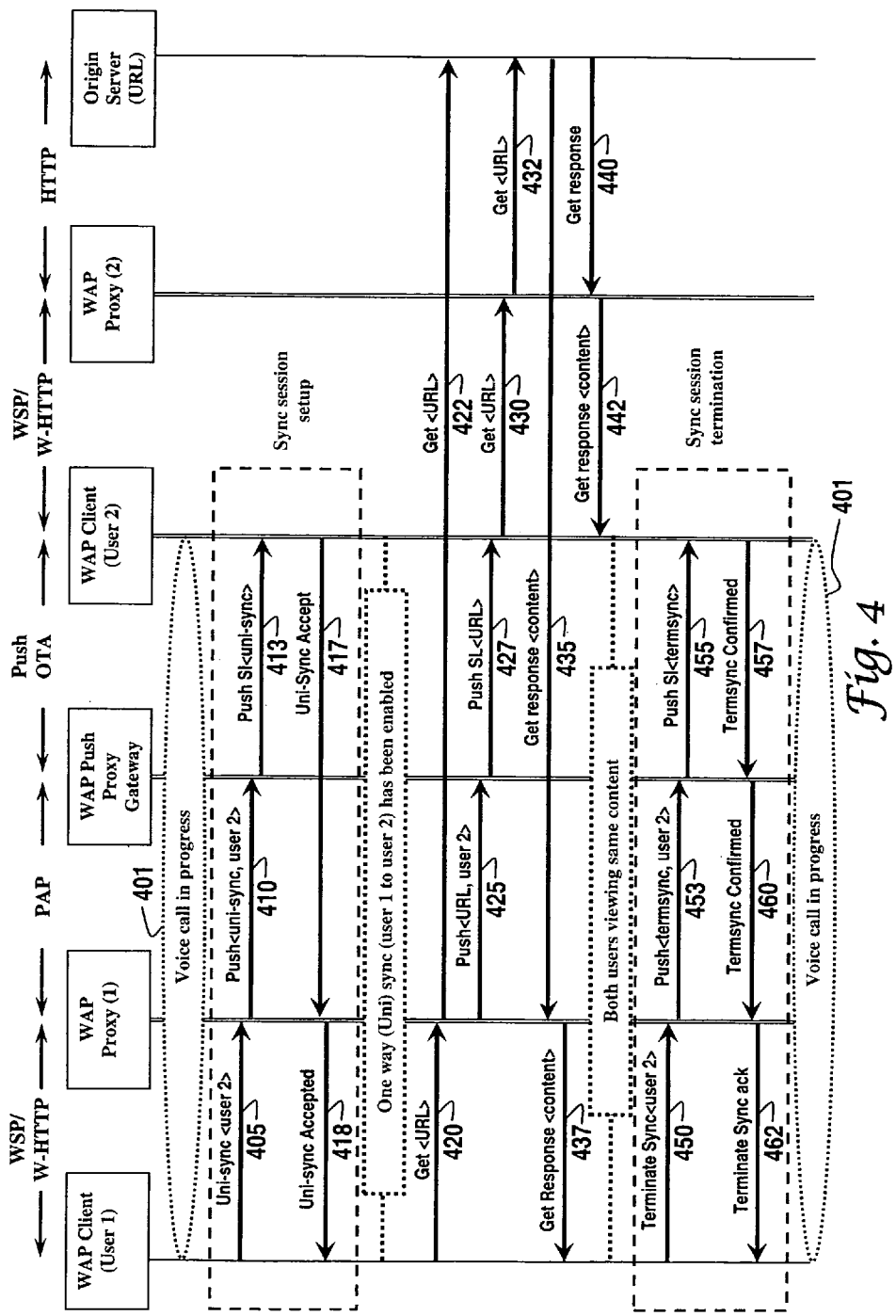
FIG. 4 shows a call flow diagram of a one-way Web content synchronization process of the present invention using multiple WAP proxies.

FIG. 4 illustrates a call flow diagram of a one-way Web content synchronization process of the present invention. This process shows the use of two WAP Proxies, one for User1 and the second for User2. However, this illustrates only one embodiment since, if both users are part of one network, the process can just as easily use the same WAP proxy for both users. Such alternate embodiments are illustrated in subsequent figures.

In this embodiment, the push initiator contacts a WAP Push Proxy Gateway (PPG), delivering content for the destination client using Internet protocols. The PPG does what is necessary to forward the pushed content to the WAP domain and the content is then transmitted over the air in the mobile network to the destination client. The Push Access Protocol (PAP) used between the push initiator and the PPG uses XML messages that may be tunneled through various well-known Internet protocols, such as HTTP.

The process begins with a voice call being initiated (step 401). Either party can initiate the voice call. The process used to initiate the telephone call is well known in the art and is not discussed further.

While, in the preferred embodiment, the voice call is shown as being in progress prior to the synchronized sessions being set-up, the voice call is not required for proper operation of the present invention. The voice call is more of a social requirement between the wireless device users prior to pushing content to another wireless device. For purposes of advertising or for other reasons, the push of Web content may be achieved prior to a voice call being set-up.

User1 sends a "uni-sync" signal destined for user 2, to WAP Proxy 1 (step 405). WAP Proxy 1 acts as a push initiator and sync proxy and transmits a "Push Sync" signal (step 410) to the WAP Push Proxy Gateway. The WAP Push Proxy Gateway transmits a "Push Service Indication" signal to User2 (the second WAP client). In accepting the synchronization session, User2 transmits a "Synchronization Acknowledgement" signal to WAP Proxy 1 (step 417) that forwards it on to User1 (step 418). At this point, a one-way synchronized session has been enabled.

As is well known in the art, the SI content type provides the ability to send notifications to end-users in an asynchronous manner. Such notifications may, for example, be about new e-mails, changes in stock prices, or news headlines.

The SI contains a short message and a Universal Resource Identification indicating a service. The message is presented to the User2 upon reception and the user is given the choice to either start the service indicated by the URI immediately or postpone the SI for later handling.

User1 accesses Web content by sending a "Get" request, containing the URL of the desired page (step 420), through WAP Proxy 1. The process of the present invention is not limited to accessing the Web content at this time. Web content may have already been accessed by User1 prior to the synchronized session between User1 and User2. WAP Proxy 1 forwards this request to the requested Web server (step 422). For example, if User1 desired to access AMAZON.COM, the request for the Web page would be transmitted over the Internet to that Web server.

The requested URL is also pushed to the WAP Push Proxy Gateway (step 425). The WAP Push Proxy Gateway then transmits this URL to User2 (step 427) in the form of a "Push Service Loading (SL)" signal. User2 responds to this with a "Get" signal, comprising the desired URL, transmitted to the origin server (identified by the URL) via WAP Proxy 2 (step 430). WAP Proxy 2 forwards the "Get" signal to the Web server (step 432) for processing.

The Service Loading content type provides the ability to cause the client on the WAP-enabled wireless device to load and execute a service that, for example, can be in the form of a WML deck. The SL contains a URI indicating the service to be loaded by the client without user intervention when appropriate.

The Web server responds to WAP Proxy 1 with the content for that URL (step 435). WAP Proxy 1 then transmits the content to User1 (step 437).

The Web site also responds to WAP Proxy 2 (step 440) with the same content (since the URL was the same). WAP Proxy 2 also forwards this content on to User2 (step 442). At this point, both User1 and User2 are viewing the same Web content.

In the embodiment of FIG. 4, the "Get" request from User2 starts after the URL push signal is received (427). However, processing can take place independently of User1's "Get" request. Furthermore, if the two users share the same WAP proxy, the URL need not even be pushed. Only the final Web content is pushed.

After User1 and User2 have completed their synchronized Web content session, one of the users (User1 in this embodiment) transmits a "terminate sync session" signal to their WAP Proxy. In this embodiment, User1 transmits the signal to WAP Proxy 1 (step 450). WAP Proxy 1 pushes the "terminate sync" signal to the WAP Push Proxy Gateway (step 453) that then forwards the signal to User2 (step 455) as a "Push SI" signal. Note that, in a uni-sync session, the "master" (the user who initiated the sync session) will be the only one who can terminate it. In a bi-directional sync session, either party can terminate the sync session.

User2 acknowledges the termination with a "terminate sync" acknowledgement signal (step 457) to the WAP Push Proxy Gateway. The WAP Push Proxy Gateway sends a "terminate sync" acknowledgement signal (step 460) to WAP Proxy 1 for User1. WAP Proxy 1 then forwards this acknowledgement signal to User1 (step 462).

At this point, the Web content synchronized session is over. However, the audio portion of the conversation may continue. Either user may also decide to terminate the audio session at any time. The termination of the audio call is well known in the art and is not discussed further. Either User1 or User2 can each continue to access the web pages, without synchronization with the other party.

In the preferred embodiment of the present invention, User 1 would need to know that User 2 is accessing the web from a wap-enabled device.

Figure 5:
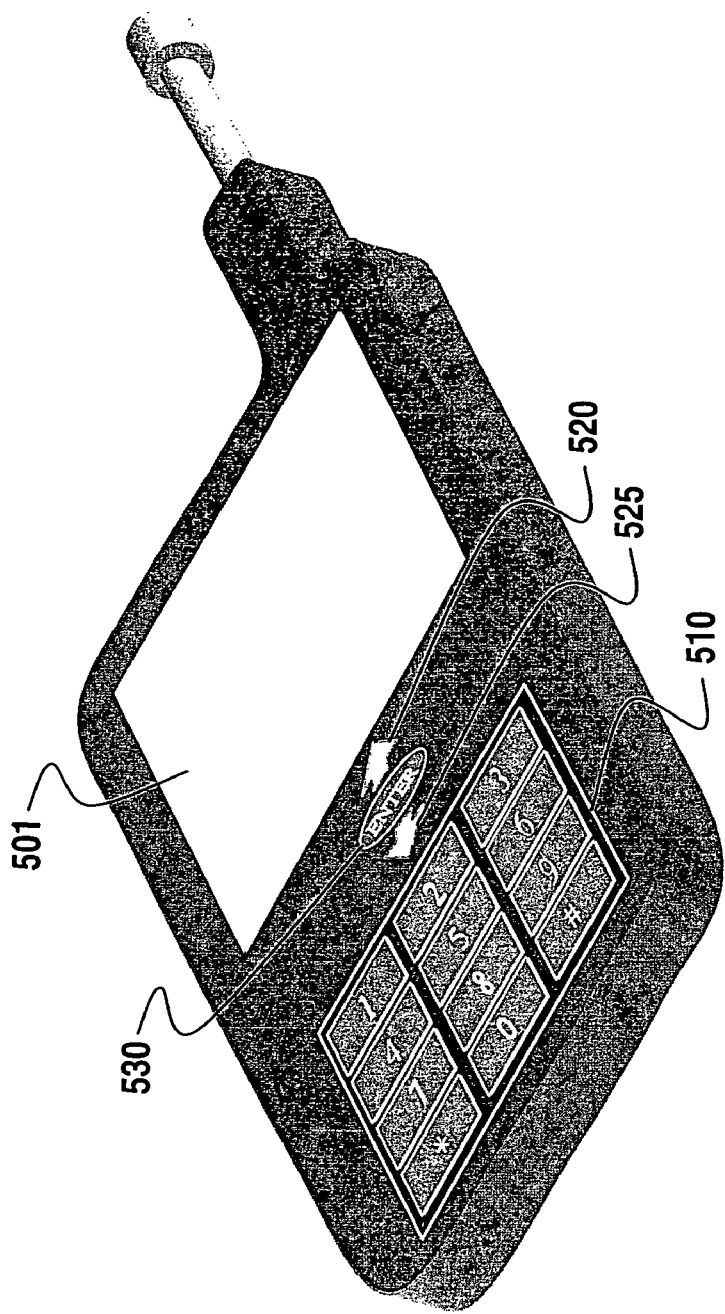
FIG. 5 shows a WAP-enabled wireless telephone of the present invention.

FIG. 5 shows a wireless device having a display (501) in accordance with the process of the present invention. The wireless device additionally is comprised of a keypad (510) for entering telephone data such as telephone numbers and names.

Control keys (520, 525, and 530) are used to scroll through web pages, to mover a cursor around on the display (501), or to place the cursor over data and enter it. The up arrow key (520) moves the cursor towards the top of the screen (501). The down arrow key (525) moves the cursor down towards the bottom of the screen (501). Once the cursor is over the hyper-link or other data to be entered, the enter key (530) is depressed to go to that hyper-link or enter the data.

Since the present invention operates with other communication devices that are WAP-capable, these other communication devices will appear differently than the wireless device illustrated in FIG. 5. For example, if a WAP-capable PDA uses the incoming call process of the present invention, the keypad and arrow keys may not be needed. The PDA may substitute a touch screen display for the keypad and arrow keys.

The Web content synchronization processes, apparatuses, and system of the present invention provide a user having a WAP-enabled wireless device to push Web content to other WAP-enabled wireless devices. While each user is viewing the Web content, they can also converse.

Figure 6:
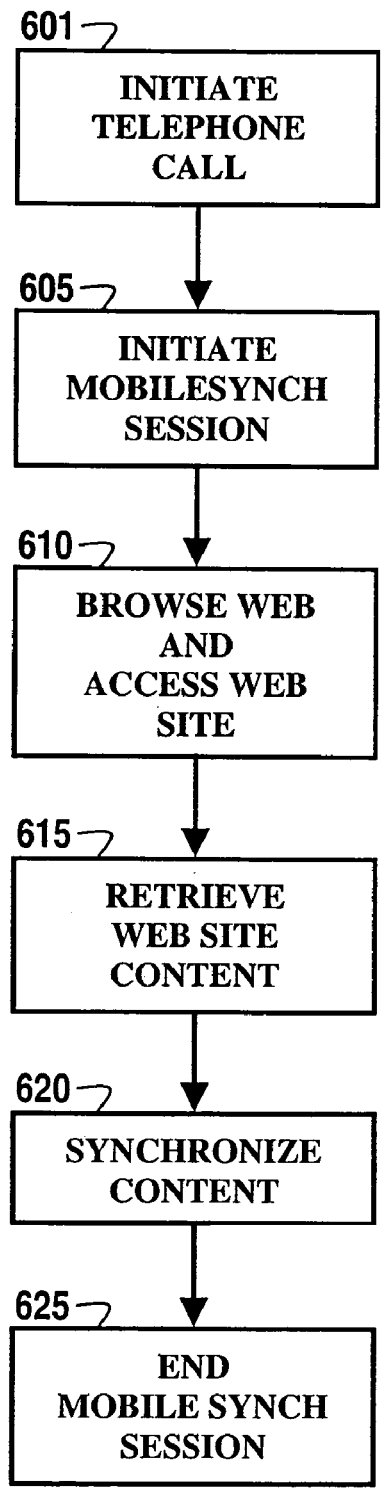
FIG. 6 shows a flowchart of a mobile Web page synchronization process of the present invention.

As an example of a use of the present invention, FIG. 6 illustrates the synchronization process of the present invention. In this embodiment, one person calls a friend (step 601) and they discuss, over their WAP-enabled wireless devices, their common friend's graduation event. They agree to buy a surprise CD or book gift for their friend from an electronic commerce site over the Internet but are not sure which title to purchase. They decide to search the Internet together for information regarding such a purchase.

One of them decides to access AMAZON.COM for the information. That person initiates the synchronization session (step 605) on their WAP user agent. This can be accomplished by going to a menu on the wireless telephone using the keypad and cursor control keys illustrated in FIG. 5. Once the "synchronization" command is highlighted by the cursor, the enter key is depressed to activate the command. Other embodiments activate the synchronization process in other ways.

At this time, the second person may or may not have their user agent active. This person may also be performing a separate search of the same or another Web site. The synchronization process of the present invention supports either scenario.

The first friend has now accessed the desired Web site on their WAP user agent (step 610). This is accomplished by entering the URL of that site, performing a search using a search engine, or any other means that are well known in the art. The Web site content is downloaded (step 615).

The Web content is automatically pushed to the second friend's wireless device to synchronize the two devices (step 620). The content is thus also displayed on the second wireless device.

In one embodiment, both people in the example of FIG. 6 have WAP-enabled wireless devices that display the Web content identically. In an alternate embodiment, the friends have different WAP-enabled wireless devices that display the same Web content but display it in a different format. For example, one wireless telephone may display graphics while the other displays only a text version of the content.

Once the Web content is displayed on each wireless device, the friends can review the information simultaneously. One of them might now want to navigate to a different Web page/deck that is retrieved from the Web server or another web site. Since the two wireless devices are in a synchronized session, the information displayed on either one of the telephones is simultaneously pushed and displayed on the other telephone.

Simultaneous with the synchronization of the Web content, the wireless device users can carry on a voice conversation using the process of the present invention. In fact, once they agree on a gift and purchase it over the Internet using their WAP-enabled wireless devices, using a process that is well known in the art, they can end the synchronized session (step 625) and continue to talk over a normal telephone call.

Applications of the synchronization processes, apparatuses, and system of the present invention provide collaboration in real-time anywhere and anytime. Mobile electronic commerce can be accomplished where a sales agent is on the phone with a potential buyer and can push Web content to the potential buyer for illustration purposes. The sales agent does not have to be sitting at a terminal in a sales office using the present invention. The sales agent can be mobile also.

In other applications, a customer sales representative can assist users with navigation by using a synchronized session. Two or more people can share and view pictures that are posted on a Web site together. The present invention also provides for interactive gaming with game web sites that are shared. In this case, the users are accessing the same instance of the game and playing against each other.

The synchronization processes, apparatuses, and system of the present invention also support multiple embodiments. One person may push pages and content while the other devices synchronize with the first one. Additionally, bi-directional synchronization can be performed such that either of the wireless terminals can change the Web content (or WML deck) to invoke the synchronization. This can be user selectable from the menu of options for the mobilesync process. Multi-way synchronization is also possible but would require one master and multiple slaves (i.e., a multi-one-way synchronized session).

Figure 7:
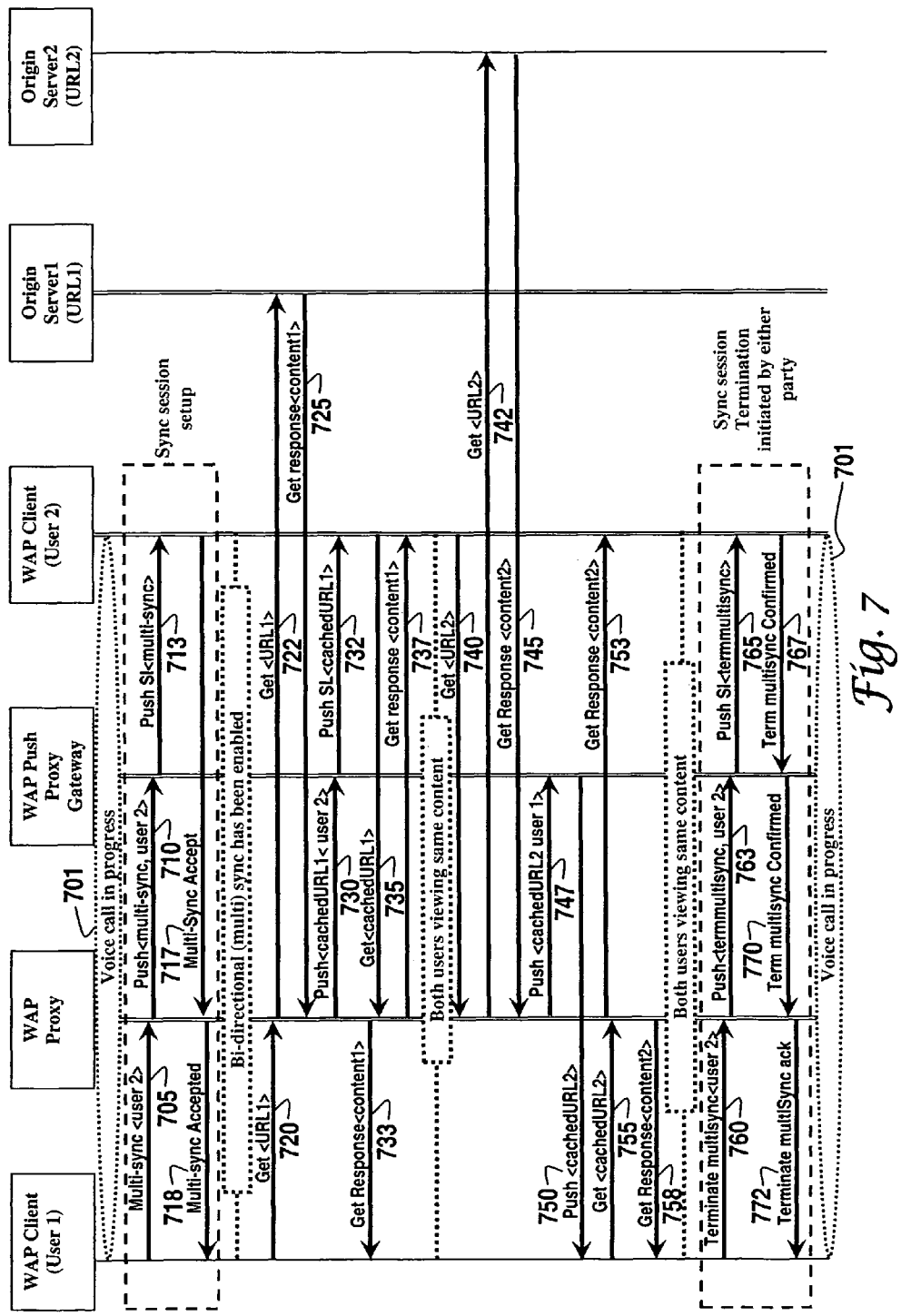
FIG. 7 shows a call flow diagram for an alternate embodiment synchronization process of a bi-directional synchronization session.

FIG. 7 illustrates an alternate embodiment of the present invention. This embodiment is a two-way synchronization process in which both users use the same WAP Proxy. As before the WAP Proxy acts as the push initiator.

As in the preferred embodiment, the voice call is already in progress (step 701). The call flow begins with User1 transmitting a "multi-sync" signal to the WAP Proxy (step 705). Using PAP, the WAP Proxy pushes a "Push multi-sync" signal to the PPG (step 710) that then transmits a "Push SI" signal to User2 (step 713).

User2 responds to the "Push SI" signal with a "multi-sync accept" signal (step 717) that is transmitted to the WAP Proxy. The WAP Proxy transmits a "sync accepted" signal to User1

(step 718). At this point, there is a bi-directional synchronized session between User1 and User2.

User1 then sends a "Get" signal with the URL to the WAP Proxy (step 720). The WAP Proxy transmits the URL in a "Get" signal to a first Web origin server (step 722).

At this point, the Web server has received and processed the URL request and responded to the WAP Proxy with a "Get Response" (step 725). This response contains the content requested by User1.

The WAP Proxy forwards the content to User1 (step 733). The WAP Proxy also transmits a "Push" signal, comprising the origin server URL, to the PPG (step 730) (in this case the WAP Proxy is acting as a sync proxy). The PPG forwards this information to User2 via a "Push SL" message (step 732).

User2 responds to the PPG's "Push SL" signal with a "Get" request to the WAP Proxy for the URL content (step 735). The WAP Proxy transmits the URL content to User2 (step 537). At this point, the Web content of User1 and User2 is synchronized.

In response to the initial Web content and/or due to the voice conversation between User1 and User2, User2 may also request Web content. To accomplish this, User2 transmits a "Get" message, comprising the desired URL, to the WAP Proxy (step 740). The WAP Proxy transmits a "Get" message, comprising the URL, to the second origin server (step 742). The second origin server transmits back the Web content to the WAP Proxy in the form of a "Get Response" message (step 745).

As before, once the WAP Proxy receives the updated Web content, it transmit a "Push" signal to both User1 (step 750) via the PPG (step 747). The WAP Proxy also transmits the Web content from the second server to User2 in the form of a "Get Response" (step 753).

User1 transmits a "Get" signal to the WAP Proxy requesting the new Web content (that was cached at the WAP proxy) (step 755). The WAP Proxy responds to User1 with the new Web content in a "Get Response" (step 758). At this point, both users are again viewing the same Web content.

After User1 and User2 have completed their synchronized Web content session, one of the users (User1 in this embodiment) transmits a "terminate sync session" signal to the WAP Proxy (step 760). WAP Proxy 1 pushes the "terminate multi-sync" signal to the PPG (step 763) that then forwards the signal to User2 (step 765) as a "Push SI" signal.

User2 acknowledges the termination with a "terminate multi-sync session) acknowledgement signal (step 767) to the PPG. The PPG sends a "terminate multi-sync" acknowledgement signal (step 770) to the WAP Proxy for User1. The WAP Proxy then forwards this acknowledgement signal to User1 (step 772).

At this point, the Web content synchronized session is over. However, the individual web data sessions may continue. The audio portion of the conversation may also continue. Either user may also decide to terminate the audio session at any time.

Figure 8:
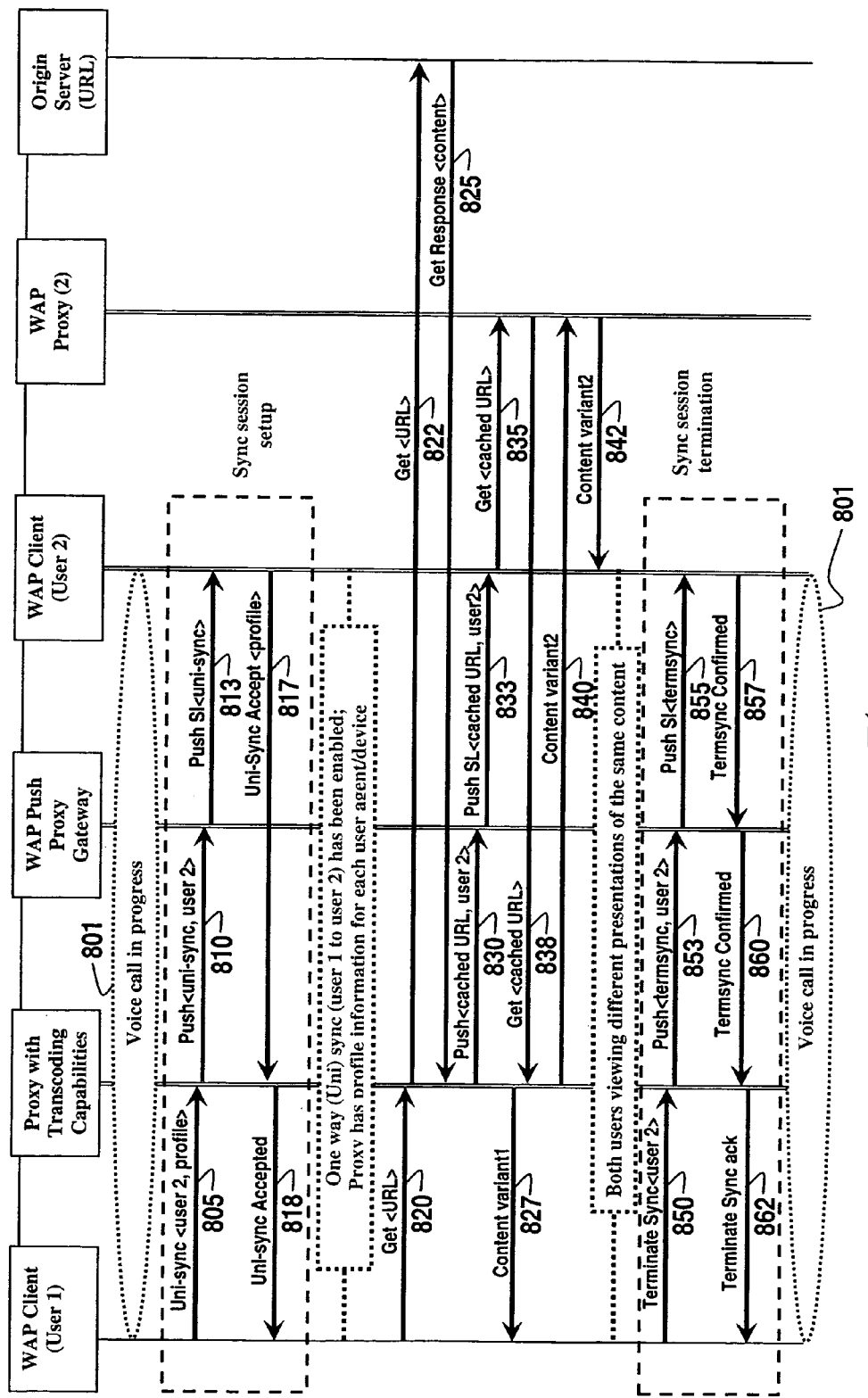
FIG. 8 shows a call flow diagram for another alternate embodiment synchronization process of a one or two way mobile synchronization session with content customization.

FIG. 8 illustrates a call flow diagram of yet another embodiment of the Web content synchronized session of the present invention. This figure illustrates an embodiment wherein the client/user agent for User1 need not be WAP-enabled. This client/user agent may, for example, be either a wired or wireless connected laptop.

The processes used in this embodiment for transforming content from one variant to another for customized presentation are well known in the art. These transcoding mechanisms are typically based on XSL, XSLT, CSS, XHTML, and other content related standards. The profiles and profile mechanisms regarding device and user agent capabilities and user preferences are also well known in the art. These are based on Composite Capabilities/Preferences Profile (CC/PP) and WAP User Agent Profile frameworks.

In this embodiment, the transcoding proxy acts as the sync proxy. This embodiment starts with the voice call already in progress (step 801). User1 transmits a "uni-sync" message, comprising of the User1's profile, addressed to user2 to the Proxy with transcoding capabilities (step 805). This transcoding proxy may be any Proxy with such capabilities in the system of FIG. 3.

As a push initiator, the Proxy transmits a "Push" signal, comprising the "uni-sync" message, to the PPG (step 810) that forwards a "Push SI" signal to User2 (step 813). User2 transmits a "uni-sync accept" message to the transcoding Proxy (step 817), along with User2 profile, that is then cached at the proxy. The proxy forwards by forwarding the "uni-sync accept" message to User1 (step 818). At this point, a one way (uni) synchronized session has been enabled between User1 and User2. Additionally, the transcoding Proxy now has the profile information for each user agent/device and knows that User1 comprises a Web client while User2 comprises a WAP client.

User1 now sends a "Get" signal comprising the desired URL to the Proxy (step 820). The Proxy forwards this request to the origin server in response to the URL (step 822). The server responds with the requested content in a "Get response" signal (step 825) to the Proxy.

Assuming that the content needs to be transcoded, the Proxy transforms the content into suitable the variants based on the user agent/device profiles of each user client. The Web client of User1 requires a different format of content from the WAP client of User2.

The Proxy then transmits the content variant to User1 (step 827). Using a "Push" message, the Proxy transmits the cached URL to the PPG (step 830) that forwards the information in a "Push SI" message to User2 (step 833).

User2 responds by transmitting a "Get" signal, with the URL, to its WAP Proxy (step 835). The WAP Proxy requests the Web content from the Proxy with transcoding capabilities by a "Get" signal with the URL (step 838). The Proxy responds with the content in the proper format to the WAP Proxy (step 840). The WAP Proxy then forwards this content to User2 (step 842). At this point, both User1 and User2 are viewing different formats or variants of the same Web content.

After User1 and User2 have completed their synchronized Web content session, one of the users (User1 in this embodiment) transmits a "terminate sync session" signal to the Proxy with transcoding capabilities (step 850). The Proxy pushes the "terminate sync" signal to the PPG (step 853) that then forwards the signal to User2 (step 855) as a "Push SI" signal.

User2 acknowledges the termination with a "terminate sync session" acknowledgement signal (step 857) to the PPG. The PPG sends a "terminate sync" acknowledgement signal (step 860) to the transcoding Proxy. The Proxy then forwards this acknowledgement signal to User1 (step 862).

At this point, the Web content synchronized session is over. However, the audio portion of the conversation may continue. Either user may also decide to terminate the audio session at any time. The individual web sessions may also continue.

The embodiment of FIG. 8 may be used by an on-line business (e.g., a merchant with an on-line presence) that has User1 as a customer service representative. The transcoding proxy (that also acts as a push initiator) and origin Web server are behind the firewall of the merchant. User1 can talk and push suitable content to User2 with the WAP enabled device. A single User2 is shown for purposes of clarity. This embodiment can be extended to multiple users (e.g., web casting or multimedia conference call with presentation).

Figure 9:
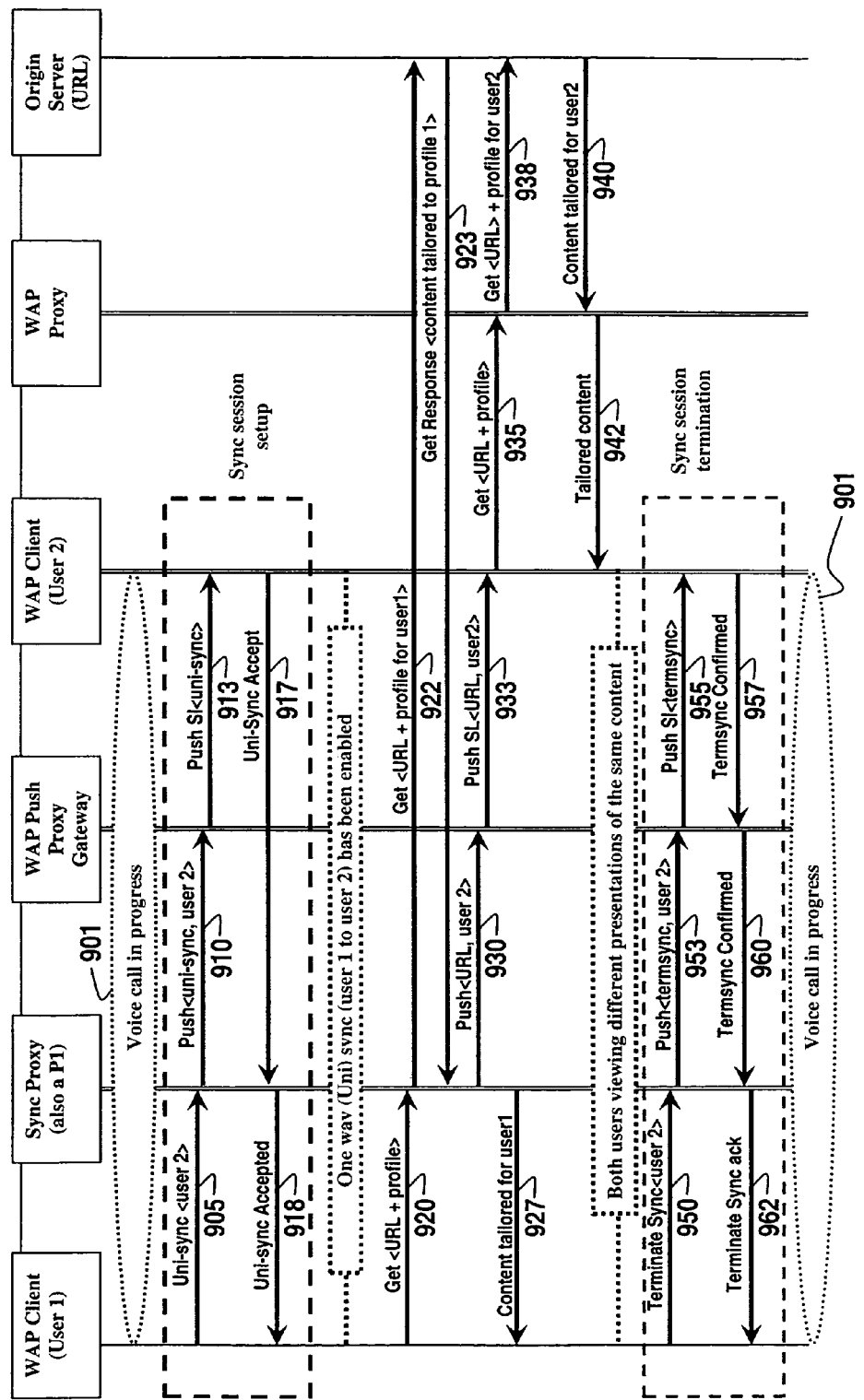
FIG. 9 shows a call flow diagram for yet another alternate embodiment synchronization process utilizing a "sync" proxy in accordance with the present invention.

FIG. 9 illustrates a call flow diagram of yet another embodiment of the Web content synchronized session of the present invention. This embodiment uses a generic proxy server on the Internet that acts as a "sync" proxy server and can perform either one-way or multi-way synchronization among devices that may be connected through the same gateway. It is also assumed that a voice call is in progress (step 901).

User1 starts with a one-way, binary "Uni-sync Initiate" signal to User2 (step 905). This command is transmitted to the sync Proxy. The sync proxy acts as a push initiator and in doing so, transmits a "Push Uni-sync" signal for User2 to the PPG (step 910). The WAP PPG transmits a "Push SI-Uni-sync" signal to User2 (step 913).

In response to the "Push SI" signal, User2 sends a "Uni-Sync Accepted" signal to the Sync Proxy (step 917). The Sync Proxy forwards this acceptance signal to User1 (step 918). At this point, a uni-sync session has been enabled between User1 and User2.

User1 then sends a "Get" signal with the URL and its profile to the Sync Proxy (step 920). The Sync Proxy forwards the "Get" signal to the Origin server (step 922). The Origin server responds with the content in a "Get response" signal (step 923).

The Sync Proxy then transmits to User1 content that has been tailored for User1's client (step 927). The Sync Proxy then pushes the URL to the PPG (step 927) using the "Push SL" signal. The PPG responds by transmitting the "Push" signal with the URL to User2 (step 930). The PPG transmits a "Push SL" signal with the URL to User2 (step 933).

User2 responds to the "Push SL" command by transmitting a "Get" signal, with the URL and the User2 profile, to the WAP Proxy (step 935). The WAP Proxy transmits a "Get" command with the URL and User2 profile to the Origin server (step 938). The server responds to the WAP Proxy with content that is tailored for User2 (step 940) and the Proxy forwards this content to User2 (step 942). At this point, both users are viewing different presentations, tailored for their respective clients, of the same content.

After User1 and User2 have completed their synchronized Web content session, one of the users (User1 in this embodiment) transmits a "terminate sync session" signal to the Sync Proxy (step 950). The Sync Proxy pushes the "terminate sync" signal to the PPG (step 953) that then forwards the signal to User2 (step 955) as a "Push SI" signal.

User2 acknowledges the termination with a "terminate sync session" acknowledgement signal (step 957) to the PPG. The PPG sends a "terminate sync" acknowledgement signal (step 960) to the Sync Proxy. The Sync Proxy then forwards this acknowledgement signal to User1 (step 962).

At this point, the Web content synchronized session is over. However, the audio portion of the conversation may continue (step 901). Either user may also decide to terminate the audio session at any time. The individual web sessions may also continue.

For purposes of clarity, the above discussion of the Web content synchronization processes of the present invention refers to two WAP-enabled telephones. Alternate embodiments use more than two WAP-enabled telephones or other communication devices.

In the preferred embodiment, the voice connection between the telephone numbers is circuit switched. Alternate embodiments use a packet switched connection. The connection may also be done over the Internet.

In summary, the Web content synchronization processes of the present invention provide users of WAP-enabled wireless devices with the ability to jointly review the same Web content while being located miles apart. This enables friends or co-workers with the ability to review the same content while discussing the content over a voice call.

It is therefore intended that the foregoing detailed description be regarded as illustrative rather than limiting, and that it be understood that it is the following claims, including all equivalents, that are intended to define the spirit and scope of this invention.

The invention claimed is:

1. A method, comprising:
   initiating, by a system including at least one processor, a voice call session between a first mobile device and a second mobile device;
   initiating, by the system, a synchronized session between the first mobile device and the second mobile device during the voice call session;
   during the voice call session and as part of the synchronized session, receiving, by the system, information, from the first mobile device, that includes location data associated with web content, and a first profile that is indicative of a first display format associated with the first mobile device;
   during the voice call session and as part of the synchronized session, receiving, by the system, a second profile that is indicative of a second display format associated with the second mobile device, in response to transmitting the location data to the second mobile device; and
   during the voice call session and as part of the synchronized session, delivering, by the system, a first version of the web content, that is customized based on the first profile, to the first mobile device, and a second version of the web content, that is customized based on the second profile, to the second mobile device.

2. The method of claim 1, wherein the initiating, by the system, the synchronized session, includes initiating the synchronized session in response to receiving an activation request from the first mobile device.

3. The method of claim 1, further comprising:
   generating, by the system, the first version of the web content and the second version of the web content based on the first profile and the second profile respectively.

4. The method of claim 3, further comprising:
   terminating the synchronization session; and
   continuing the voice call session.

5. The method of claim 1, wherein the initiating the synchronized session includes receiving a synchronization command from the first mobile device.

6. The method of claim 1, wherein the initiating, by the system, a synchronized session includes initiating a uni-sync session between the first mobile device and the second mobile device, during the voice call session.

7. The method of claim 1, wherein the initiating, by the system, a synchronized session includes initiating a multi-sync session between the first mobile device and the second mobile device, during the voice call session.

8. The method of claim 1, wherein the receiving, by the system, information, from the first mobile device includes receiving a universal resource locator associated with the web content.

9. A system, comprising:
   at least one memory that stores computer-executable instructions;
   at least one processor, communicatively coupled to the at least one memory, that facilitates execution of the computer-executable instructions to at least:
   initiate a voice call session between a first mobile device and a second device;
   during the voice call session, initiate a synchronization session between the first mobile device and the second device;

during the voice call session and as part of the synchronization session, receive from the first mobile device, location data associated with web content and a first profile that is indicative of a display format associated with the first mobile device;

during the voice call session and as part of the synchronized session, receive a second profile that is indicative of a second display format associated with the second device, in response to transmission of the location data to the second device; and during the voice call session and as part of the synchronization session, facilitate delivery of a first version of the web content, that is modified based on the first profile, to the first mobile device and a second version of the web content, that is customized based on the second profile, to the second device.

10. The system of claim 9, wherein the at least one processor further facilitates the execution of the computer-executable instructions to:

receive, during the voice call, a terminate synchronization signal from the second device;

terminate the synchronization session in response to the receiving; and continue the voice call between the first mobile device and the second device.

11. The system of claim 9, wherein the at least one processor further facilitates the execution of the computer-executable instructions to receive a synchronization command from the first mobile device.

12. The system of claim 9, wherein the at least one processor further facilitates the execution of the computer-executable instructions to generate the first version of the web content, by employing the first profile.

13. A method, comprising:

initializing, by a first wireless device comprising at least one processor, a synchronization session during a voice call session between the first wireless device and a second wireless device;

during the voice call session and as part of the synchronization session, transmitting, by the first wireless device, information comprising location data representing web content and a first profile indicative of a first display format associated with the first wireless device, to a network node; and during the voice call session and as part of the synchronization session, receiving, by the first wireless device, a first presentation of the web content that is tailored based on the first profile, wherein during the voice call session and as part of the synchronized session, a second profile that is indicative of a second display format associated with the second wireless device is transmitted to the network node, in response to the location data being transmitted to the second wireless device, and during the voice call session and as part of the synchronized session, a second presentation of the web content that is tailored based on a second profile, is delivered to the second wireless device.

14. The method of claim 13, further comprising:

receiving, by the first wireless device, during the voice call session, a terminate synchronization signal from the second wireless device; and continuing the voice call session between the first wireless device and the second wireless device after the synchronization session is terminated.

15. The method of claim 13, wherein the initializing the synchronized session includes transmitting a synchronization command.

16. The method of claim 13, wherein the first presentation is generated by employing the first profile.

17. The method of claim 13, wherein the transmitting includes transmitting a universal resource locator associated with the web content.

18. A non-transitory computer-readable storage medium having instructions stored thereon that, in response to execution, cause a system comprising at least one processor, to perform operations comprising:

initiating a voice call session between a first mobile device and a second mobile device;

initiating a synchronized session between the first mobile device and the second mobile device during the voice call session;

during the voice call session and as part of the synchronization session, receiving from the first mobile device, a command comprising a location of web content and a first profile indicative of a first display format associated with the first mobile device;

during the voice call session and as part of the synchronized session, receiving, from the second mobile device, a second profile that is indicative of a second display format associated with the second mobile device, in response to transmitting the location to the second mobile device; and during the voice call session and as part of the synchronization session, facilitating delivery of a first presentation of the web content that is tailored for the first mobile device based on the first profile, to the first mobile device, and a second presentation of the web content that is tailored for the second mobile device based on the second profile, to the second mobile device.

19. A non-transitory computer-readable storage medium having instructions stored thereon that, in response to execution, cause a system comprising at least one processor, to perform operations, comprising:

initiating a synchronization session during a voice call session between a first mobile device and a second mobile device;

during the voice call session and as part of the synchronization session, transmitting, by the first mobile device, location data representing web content and a first profile that is utilized to identify a first display format supported by the first mobile device to a network node; and during the voice call session and as part of the synchronization session, receiving at the first mobile device, a first modified version of the web content that is generated based on the first profile, wherein during the voice call session and as part of the synchronized session, a second profile that is indicative of a second display format associated with the second mobile device is transmitted to the network node, in response to the location data being transmitted to the second mobile device, and during the voice call session and as part of the synchronized session, a second modified version of the web content that is generated based on a second profile, is delivered to the second mobile device.

* * * * *